United States Patent [19]
Cardwell, Jr.

[11] 3,913,000
[45] Oct. 14, 1975

[54] TWO-PHASE SOLID STATE POWER CONVERTER

[75] Inventor: Gilbert I. Cardwell, Jr., Palos Verdes Peninsula, Calif.

[73] Assignee: Hughes Aircraft Company, Culver City, Calif.

[22] Filed: May 29, 1973

[21] Appl. No.: 365,295

[52] U.S. Cl. .................. 321/2; 321/18; 321/27; 323/17
[51] Int. Cl.² ................................. H02M 3/22
[58] Field of Search ............... 321/2, 2 S, 27, 18; 323/17, DIG. 1

[56] References Cited
UNITED STATES PATENTS
3,418,557   12/1968   Schaefer ................ 321/18
3,439,251   4/1969   Schaefer ................ 321/2 X

*Primary Examiner*—Gerald Goldberg
*Attorney, Agent, or Firm*—W. H. MacAllister, Jr.; D. O. Dennison

[57] ABSTRACT

A driven two-phase power converter such as a DC-to-AC inverter or boost converter is modified by the incorporation of a unique differential current transductor and transistor pulse drive circuit. The differential current transductor senses any difference in the average current in the two legs of the two-phase power converter circuit and produces a voltage proportional to that current difference. This voltage is then used in the pulse drive circuit to control, on a half-cycle basis, the widths of the drive pulse to the switching transistors in a manner which equalizes the currents in the two legs.

11 Claims, 5 Drawing Figures

TWO-PHASE SOLID STATE POWER CONVERTER

RELATION TO GOVERNMENT CONTRACT

The invention herein described was made in the course of a contract or subcontract thereunder, with the Department of the Air Force.

FIELD OF THE INVENTION

This invention relates to electronic power conditioning circuits and more specifically to improved transistorized voltage converters and inverters.

DESCRIPTION OF THE PRIOR ART

It is frequently necessary, when operating circuits from storage batteries, or other low-voltage DC power sources, to provide means for increasing the supply voltage level. In the past, many circuits have been devised to accomplish the voltage conversion function. Such circuits include the so-called "boost-add" or "boost-converter" circuits and "inverter" circuits. Included within each of the general categories of power converter circuits there exists countless specific circuits of greater or lesser complexity.

Among the more popular circuits in common usage are the driven two-phase voltage boost converters and the driven DC-to-AC inverter circuit. Both of these circuits share the common feature of utilizing two solid state switches, usually power transistors, which are driven, or switched in phase opposition. The drive pulses for such circuits have been generated, for example, by transistor multivibrators running at frequencies on the order of hundreds of thousands of Hertz.

Because of their similarities, the driven two-phase boost converter and the driven DC-to-AC inverter also share certain shortcomings which detract from their full efficiency. The shortcomings stem from mismatches in the parameters of the two transistor switches which are utilized in such circuits. Specifically, the transistor parameter which is most difficult to match and which presents the greatest difficulty for the efficient utilization of these circuits is that known as charge storage delay time. Another parameter which also causes degraded performance in such circuits, especially at the lower switching frequencies is the so-called "collector-emitter saturation voltage." Both of these parameters are given only in general terms in the transistor manufacturers' specifications and usually vary widely from transistor to transistor.

It has been found, for example, that in the center-tapped DC-to-AC inverter, differences in charge storage delay times as small as one microsecond can cause current errors as great as an ampere or more. This current is effectively a DC current which tends to saturate the power transformer. In the two-phase boost converter circuit, differences in charge storage delay times cause one leg of the circuit to operate at levels significantly higher than the other leg, in turn causing a high AC ripple, possible saturation and overload.

In the past these problems have been minimized by very careful matching of the two transistor switches and by severly derating the transformers, coils, and other circuit components. The matching of transistor parameters is unsatisfactory, however, since the charge storage delay time and the collector-emitter saturation voltage are generally unpredictable over the transistor lifetime. The use of larger and heavier transformers, chokes and other circuit components, on the other hand, is accompanied by very significant increases in circuit weight and cost.

Accordingly, it is a general object of the present invention to substantially eliminate the problems of differences in transistor charge storage delay times and collector-emitter saturation voltages in driven two-phase power converter circuits.

It is another object of the present invention to provide circuit means for sensing and balancing the relative loads of the two legs of two-phase power converter circuits.

It is yet another object of the present invention to provide more efficient utilization of two-phase power converter circuits.

It is still another object of the present invention to provide a novel two-phase drive circuit which compensates for differences in charge storage delay times and collector-emitter saturation voltages of the driven transistors.

SUMMARY OF THE INVENTION

In keeping with the principles of the present invention, these objects are accomplished with unique current sensing and drive pulse generating circuitry. A sensing device termed a differential current transductor is utilized in the two-phase power converter circuit to sense the average current unbalance between the two legs of the two-phase converter or inverter. Any difference in current caused, for example, by mismatched transistors is converted to a control voltage. This control voltage, in turn, is used in a unique pulse generator/modulator circuit to vary the pulse width, on a half-cycle basis, of the drive pulses applied to the switching transistors.

In effect then, the drive pulses to the transistor in the leg of the circuit carrying the greater current are shortened and/or the pulses to the other transistor are lengthened proportionately. The average drive pulse widths, however, can be, and usually are, controlled to maintain the power converter output level at its desired value.

BRIEF DESCRIPTION OF THE DRAWINGS

The above-mentioned and other features and objects of the present invention will become more apparent by reference to the following description taken in conjunction with the accompanying drawings, wherein like reference numerals denote like elements and, in which.

DESCRIPTION OF THE PREFERRED EMBODIMENTS

Figure 1:
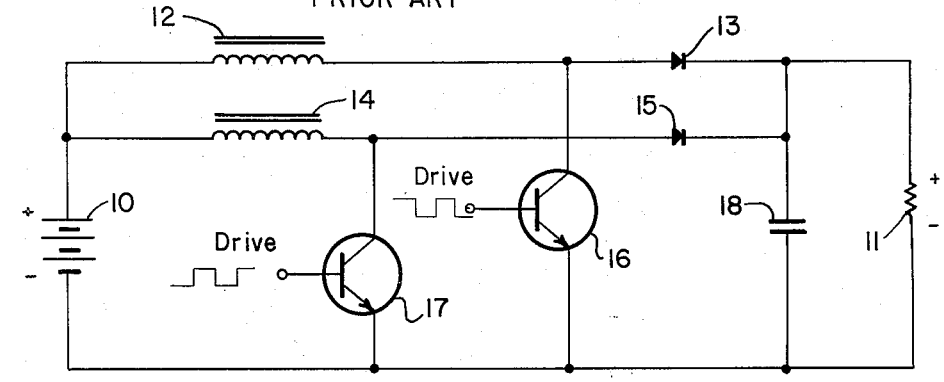
FIG. 1 is a schematic diagram of a two-phase boost converter of prior art design.

Referring more specifically to the drawings, FIG. 1 is a schematic diagram of a driven two-phase boost converter circuit of a type known in the art. This circuit is included to facilitate an understanding of the principles of the present invention. In FIG. 1 a source of direct current represented by battery 10 is connected to a load 11 by two identical legs. The first leg comprises the serial combination of a storage inductor or coil 12 and a blocking diode 13 with the second leg comprising a coil 14 and diode 15. First and second switching transistors 16 and 17 are connected between the junctions of the coils and diodes of the first and second leg and ground, respectively. A capacitor 18 is connected in shunt across load 11, completing the circuit of FIG. 1.

Symmetrical wave drive pulses from a drive source, not shown, are applied alternately and sequentially between the emitter and base electrodes of transistors 16 and 17. These push-pull drive pulses are supplied by conventional pulse generating means known in the art. The operation of the circuit of FIG. 1 is wellknown and need only be mentioned briefly. During one half-cycle transistor 16 is switched to its "on" or conducting state. During this time interval current from battery 10 flows through coil 12 and transistor 16. An induced magnetic field is created in coil 12. When transistor 16 is switched to its "off" or non-conducting state the collapsing magnetic field in coil 12 creates a voltage across the coil which combines with the voltage of battery 10. The resulting current flows through diode 13 and load 11. During the next half-cycle a similar sequence of events takes place in the other leg of the circuit. Capacitor 18 smooths out the ripple voltage at the load, thereby maintaining a relatively constant DC output voltage.

As mentioned hereinabove, one of the shortcomings of the arrangement of FIG. 1 arises from the fact that transistors 16 and 17 are not easily matched in their charge storage delay time and collector-emitter saturation voltage parameters. The drive pulses to the base electrodes of transistors 16 and 17 are, according to the prior art, identical except for a phase difference of 180°. With the other components of the system being matched it would be expected that the average currents in the two legs of the boost converter would be equal. It has been found, however, that relative differences in charge storage delay times of the two transistors of one microsecond can cause one leg of the boost converter to operate at a current level of 20 percent or more above that of the other leg. This, in turn, can require the use of larger or heavier coils 12 and 14 and capacitor 18.

Figure 2:
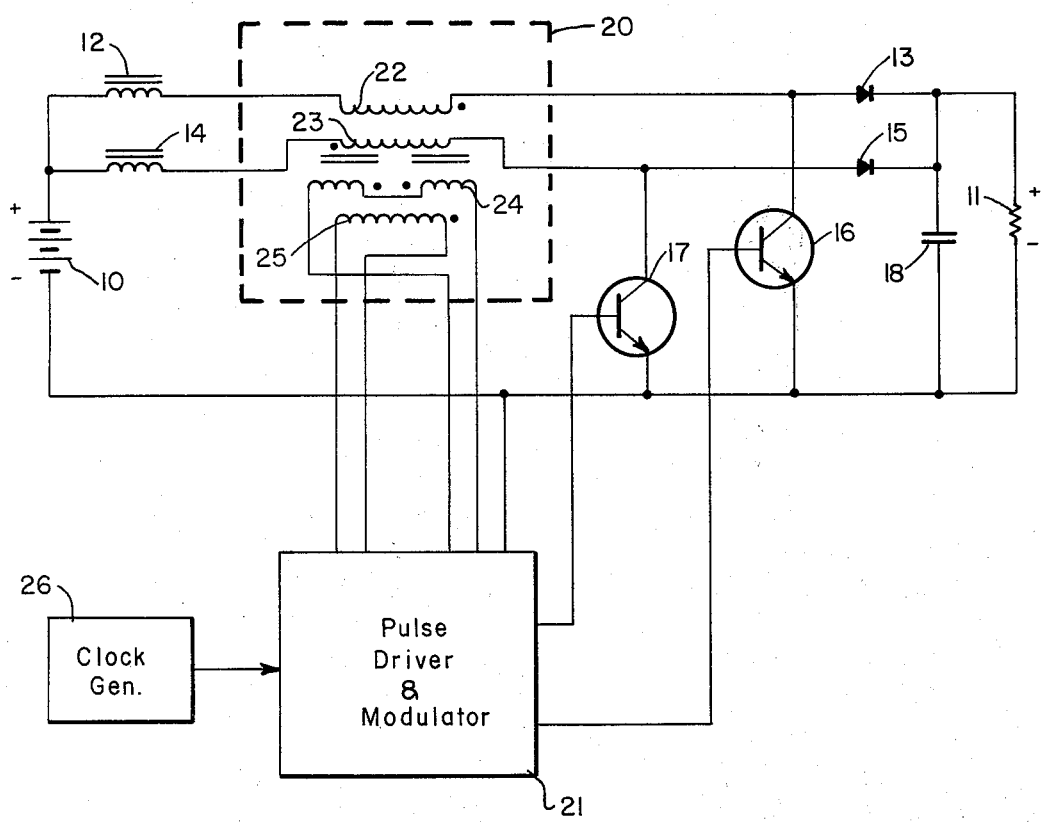
FIG. 2 is a schematic diagram of a two-phase boost converter circuit modified in accordance with the teachings of the present invention.

In keeping with the principles of the present invention these problems have been overcome with the embodiment of FIG. 2. The circuit of FIG. 2 is basically the same as that of FIG. 1 with the important addition of two unique circuit elements. The elements are a differential current transductor 20 and a pulse driver and modulator circuit 21.

Differential current transductor 20 is basically a transductor sometimes referred to as a "series-connected magnetic amplifier" or a "saturable reactor" which has been modified by the addition of a second "control" winding and an additional "bias" winding. A first control winding 22 is connected in series between coil 12 and diode 13. The second control winding 23 is connected in series with coil 14 and diode 15. Windings 22 and 23 are connected in an opposite polarity sense. For a discussion of transductors generally, see: H. F. Storm, "Magnetic Amplifiers", John Wiley & Sons, Inc., New York, 1955, page 167–169; and A. G. Milnes, "Transductors and Magnetic Amplifiers", MacMillan & Co. Ltd., London, 1957, pages 231–233.

A pair of counter-connected windings joined to form load winding 24 are connected to the pulse driver and modulator circuit 21. The bias winding 25 is likewise connected to the pulse driver and modulator circuit. A clock generator 26 having an AC square wave output is also connected to pulse driver and modulator circuit 21.

Figure 3:
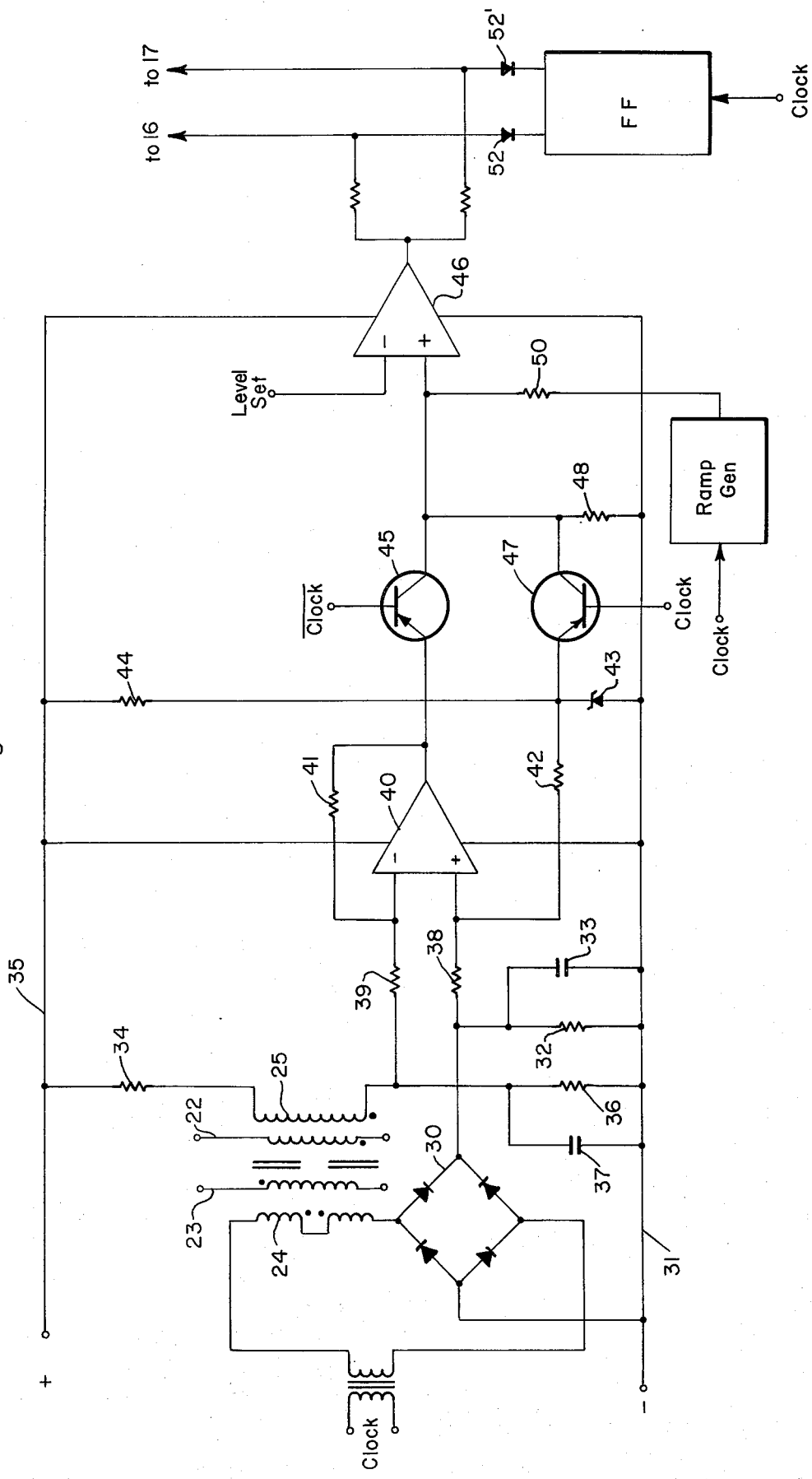
FIG. 3 is a schematic diagram of a transistor drive circuit useful in practicing the present invention.

The operation of the embodiment of FIG. 2 will only be understood after a description of the pulse driver and modulator circuit shown in FIG. 3. Briefly, however, differential current transductor 20 senses any difference in the average currents flowing through coils 12 and 14 in the two legs of the boost converter. Due to the fact that control windings 22 and 23 are connected in phase opposition equal current in the two legs produces no net flux in transductor 20 and therefore no change in the current flowing through load winding 24. However, should a current unbalance in the two legs occur, the current difference is reflected by a change in the current in load winding 24. The pulse driver and modulator circuit recognizes this change in current and alters the relative length of the drive pulses to transistors 16 and 17 to reduce the current difference to zero in the manner of a negative feedback loop.

Reference is now made to the schematic diagram of FIG. 3 which illustrates the circuit by which the drive pulses are generated. In FIG. 3, one end of the load winding 24 of differential current transductor 20 is connected to one input side of a full wave diode bridge 30. The AC square wave from the clock pulse generator 26, not shown, is coupled between the other input of diode bridge 30 and the other end of load winding 24 through an isolation transformer. The low side output of bridge 30 is connected to negative bus 31 and the high side output of bridge 30 is connected through the parallel combination of resistor 32 and capacitor 33 to negative bus 31.

One end of bias winding 25 of the differential current transductor 20 is connected through resistor 34 to the positive bus 35. The other end of bias winding 25 is connected through the parallel combination of resistor 36 and capacitor 37 to negative bus 31. In practice, the values of resistors 32 and 36 should be identical for reasons to be discussed in detail hereinbelow. The nongrounded ends of resistors 32 and 36 are connected through resistors 38 and 39 to the noninverting input and inverting input, respectively, of op amp 40. The inverting input of op amp 40 is also connected to the op amp output by means of feedback resistor 41. The noninverting input of op amp 40 is connected through resistor 42 to the cathode of zener diode 43. The anode of zener diode 43 is connected to negative bus 31 and the junction of its cathode and resistor 42 are connected through resistor 44 to positive bus 35. The output of op amp 40 is connected through switching transistor 45 to the noninverting input of level detecting op amp 46. The cathode of zener diode 43 is similarly connected through switching transistor 47 to the same input of op amp 46. The collectors of transistors 45 and 47 are connected through resistor 48 to negative bus 31.

A third input signal to the noninverting input of op amp 46 is derived from ramp generator 49 through resistor 50. Ramp generator 49 generates a linear sawtooth voltage having a frequency which is twice the clock frequency with which it is synchronized. A DC level-set voltage which can be derived from the boost converter output or which can be derived externally is applied to the inverting input of op amp 46. The output of op amp 46 is coupled through a pair of current limiting resistors to the base electrodes of transistors 16 and 17 of FIG. 2. These base electrodes are also connected to the outputs of flip-flop 51 through diodes 52 and 52'. Flip-flop 51 is, in turn, driven by the clock generator, not shown.

In describing the operation of the pulse generator and modulator circuit of FIG. 3, it is convenient to assume initially that the average currents through control windings 22 and 23 are equal. The clock pulse input to the load winding 24 of the differential current transductor produces an operating AC carrier for the transductor. The current in load winding 24 is proportional to the sum of the currents in the other windings of the transductor. However, since it has been initially assumed that the net current in control windings 22 and 23 is zero, the current through load winding 24 is proportional to the current in bias winding 25; and it is identical if, as is the case, windings 24 and 25 have the same number of turns.

The current in load winding 24 is rectified by diode bridge 30 and passed through resistor 32. Capacitor 33 serves to remove the AC component from the resultant voltage. The bias winding current is passed through resistor 36 with the AC component of the resultant voltage drop being removed by the filtering action of capacitor 37. Since the currents through resistors 32 and 36 are equal, and since the resistance values are also equal, the voltages at the nongrounded ends of the resistors are also equal. The value of resistor 34 is selected in order to insure that these voltages are initially equal.

A reference voltage for the circuit of FIG. 3 is provided by the voltage drop across zener diode 43. This reference voltage is applied to the noninverting input of op amp 40, which is connected in a differential amplifier configuration. With a zero differential voltage input (i.e., equal voltages across resistors 32 and 37) the output voltage of op amp 40 is equal to the reference voltage across zener diode 43.

The reference voltage established by zener diode 43 is also applied to the noninverting input of level detecting op amp 46 through switching transistor 47. Switching transistors 45 and 47 are driven in phase opposition by clock generator 26. Thus, the reference voltage and the output voltage of op amp 40 are alternately applied to level detecting op amp 46 at the clock frequency.

A third signal to the noninverting input of op amp 46 in the form of a saw-tooth waveform or recurring ramp voltage is generated by ramp generator 49. As mentioned hereinabove, this saw-tooth has a period of one-half the clock period and is summed with the alternately recurring outputs of transistors 45 and 47.

The summed signals to the noninverting input of op amp 46 are compared therein with the DC level-set voltage applied to the inverting input of the op amp. This level-set voltage may be established manually, for example, or alternately by means of a feedback loop from the output of the boost converter circuit of FIG. 2, as is known in the art. It is this voltage which controls the output voltage of the boost converter circuits. When the voltage to the noninverting input is equal to or greater than that of the inverting input, an output is obtained from level detecting op amp 46. The pulsed output is, in turn, steared by flip-flop 51 to the switching transistors of the boost converter.

When an unbalance occurs in the average current in the two legs of the boost converter, for example, by reason of a mis-match in the charge storage delay times of transistor 16 and 17, the output voltage of the differential current transductor changes. The magnitude of the change is directly proportional to the magnitude of the current unbalance. The change in transductor output appears across resistor 32 and therefore at the output of op amp 40.

Figure 4:
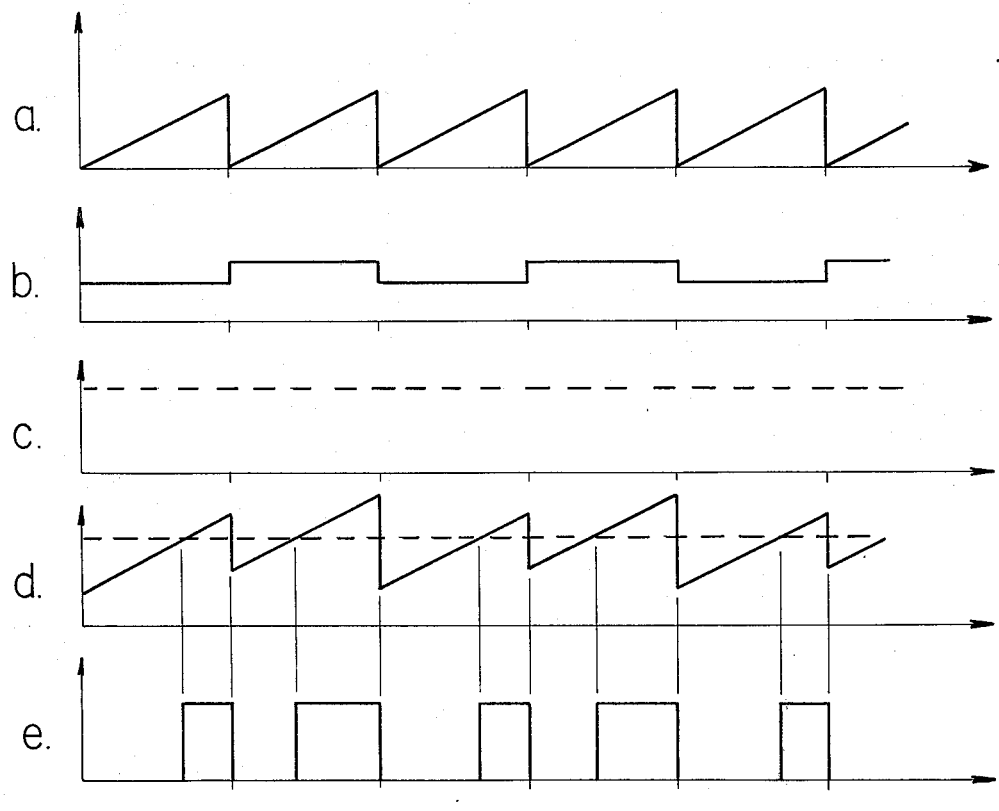
FIG. 4 is a graphic representation of typical waveforms at points in the circuit of FIG. 3.

In FIG. 4 there is shown in graphical form the waveforms at the input and output of level detecting op amp 46. The waveform shown at FIG. 4a corresponds to the ramp voltage produced by ramp generator 49. The waveform shown at FIG. 4b corresponds to the switched output of transistor 45 and 47 for an unbalanced condition. The ramp voltage and switched voltage of FIGS. 4a and 4b are shown combined in FIG. 4d. The DC level-set voltage which is applied to the inverting input of op amp 46 is shown at FIG. 4c and again superimposed on the noninverting input voltage at FIG. 4d.

As the ramp voltage crosses the threshold defined by the level-set voltage input, output pulses are generated by op amp 46. These output pulses are shown in FIG. 4e. It is seen that the width of the output pulses are thereby modulated so that they are directly proportional to the difference between the output voltage of op amp 40 and the reference voltage across zener diode 43. These modulated output pulses then are steared by flip-flop 51 and, in turn, drives transistors 16 and 17. Thus, if transistor 17 of FIG. 2, for example, has a longer charge storage delay time than transistor 16, the shorter drive pulses are applied to transistor 17, thereby compensating for the difference.

By increasing the magnitude of the level-set voltage of FIG. 4c shorter output pulses are obtained, while the ratio of the pulse widths remains constant. The output of the boost converter circuit is thereby lowered while still retaining the current balance in the two legs. Conversely, in order to increase the output level of the boost converter circuit, the magnitude of the level-set voltage is decreased. As mentioned hereinabove, the level-set voltage can be easily derived from the output of the boost converter to provide feedback regulation.

Figure 5:
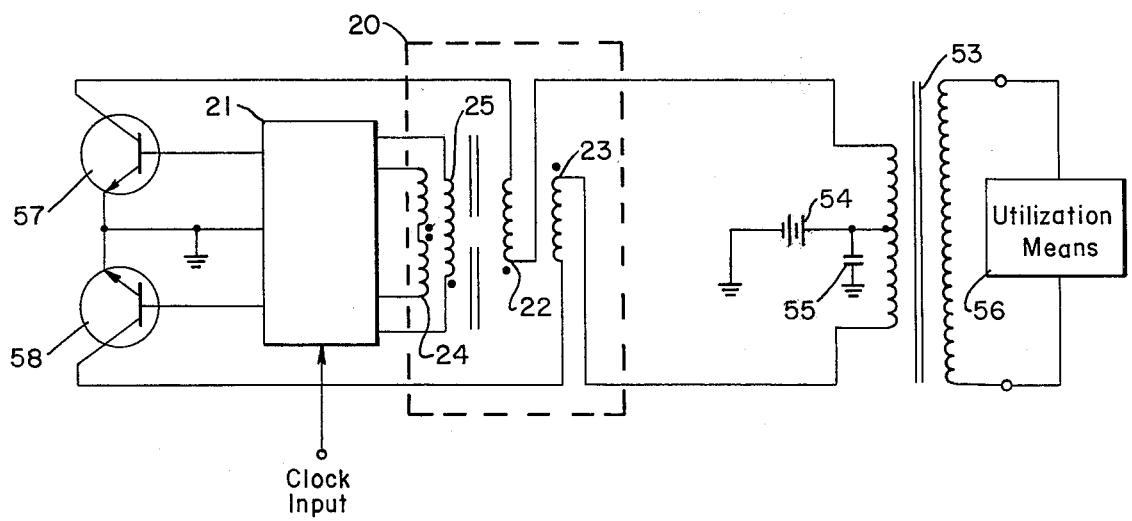
FIG. 5 is a schematic diagram of a driven DC-to-AC inverter in accordance with the teachings of the present invention.

In FIG. 5 there is shown a diagram of a modified driven DC-to-AC inverter in accordance with the present invention. As before, like reference numerals have been carried over from FIGS. 2 and 3 to designate like circuit elements. The DC-to-AC inverter of FIG. 5 is conventional except for the addition of differential current transductor 20 and pulse generator-modulator circuit 21. A clock pulse generator of conventional design is also employed but for the sake of clarity is omitted from FIG. 5.

The circuit consists of a power transformer 53 having a primary winding, the center tap of which is connected to the positive terminal of battery 54. Capacitor 55, between the centertap and ground, can be utilized in situations where the battery is physically located some distances from the inverter. The output winding of transformer 53 is connected to utilization means 56 which can be an AC load or a rectifier circuit for converting the AC output back to DC.

As before, the control windings 22 and 23 of differential current transductor 20 are connected in series with the collectors of switching transistors 57 and 58, respectively. Also, as in the case of boost converter circuit of FIG. 2, these control windings are counter-connected so that equal average currents in the two legs of the inverter produces no net flux in the transductor. The operation of the embodiment of FIG. 5 is similar to the operation of a conventional DC-to-AC inverter except that the average current in the two legs of the primary of transformer 53 are equalized by means of the circuit modification shown. In other words, any departure from current balance in the two legs is detected by the differential current transductor 20 and utilized in pulse generator and modulator circuit 21 to control the relative lengths of the drive pulses to transistors 57 and 58.

In all cases it is understood that the above-described embodiments are merely illustrative of but a small number of the many possible specific embodiments which can represent applications of the principles of the present invention. Numerous and varied other arrangements can be readily devised in accordance with these principles by those skilled in the art without departing from the spirit and scope of the invention.

What is claimed is:

1. A two-phase power converter comprising, in combination:
   a source of DC power;
   a first path comprising the serial combination of a first inductive means and first transistor switch connected across said power source;
   a second path comprising the serial combination of a second inductive means and a second transistor switch connected across said power source;
   pulse driving means for driving said transistor switches in phase opposition with first and second trains of regularly recurring drive pulses;
   output means connected to said first and second inductive means;
   comparison means for comparing the average currents in said first and second paths and for producing a voltage proportional to a current imbalance in said paths;
   pulse modulator means associated with said pulse driving means and coupled to said comparison means for adjusting the relative lengths of the drive pulse of said first and second trains, the relative lengths of said adjusted drive pulses being proportional to said voltage; and
   means for applying the train of pulses having the shorter relative pulse lengths to the transistor of the path having the greater average current.

2. The power converter according to claim 1 wherein said first and second inductive means comprise storage inductors and said output means comprises a pair of blocking diodes.

3. The power converter according to claim 1 wherein said first and second inductive means each comprises one-half of a centertapped power transformer and said output means comprises a second winding of said transformer.

4. The power converter according to claim 1 wherein said comparison means comprises a transductor having a first and second control winding, a bias winding and a load winding.

5. The power converter according to claim 4 wherein said first and second control windings are connected in series with said first and second inductive means, respectively, in a flux opposing sense.

6. A two-phase power converter comprising, in combination:
   a source of DC power;
   first and second switching elements, the conductive state of said switching elements being controlled by signals applied to drive inputs thereof;
   a first inductive path coupling said first switching element across said DC power source, a second inductive path coupling said second switching element across said DC power source;
   current sensing means serially connected in said first and second inductive paths, the output of said current sensing means being proportional to a current imbalance between said first and second paths;
   pulse generating means having at least two inputs and a first and second push-pull output;
   means for applying clock pulses to one input of said pulse generating means;
   means for connecting the output of said current sensing means to the other input of said pulse generating means;
   means for connecting said first and second outputs of said pulse generating means to the drive inputs of said first and second switching elements, respectively,
   said pulse generating means being adapted to vary the pulse widths of the output pulses in a manner which minimizes said current imbalance, and
   means for extracting an output voltage from said first and second inductive paths.

7. The power converter according to claim 6 wherein said current sensing means comprises a differential current transductor.

8. The power converter according to claim 6 wherein each of said inductive paths includes a storage inductor.

9. The power converter according to claim 6 wherein said inductive paths each include one-half of a center-tapped power transformer.

10. A driven DC-to-AC inverter comprising, in combination:
    a source of DC power;
    first and second switching elements, the conductive state of said switching elements being controlled by signals applied to drive inputs thereof;
    a transformer having at least one center tapped primary winding and a secondary winding;
    a first inductive path serially coupling said first switching element and a first half of said primary winding across said DC power source;
    a second inductive path serially coupling said second switching element and a second half of said primary winding across said DC power source;
    current sensing means serially connected in said first and second inductive paths, the output of said current sensing means being proportional to a current imbalance between said first and second paths;
    pulse generating means having at least two inputs and a first and second push-pull output;
    means for applying clock pulses to one input of said pulse generating means;
    means for coupling the output of said current sensing means to the other input of said pulse generating means;

means for coupling said first and second outputs of said pulse generating means to the drive inputs of said first and second switching elements, respectively;

said pulse generating means being adapted to vary the pulse widths of the output pulses in a manner which minimizes said current imbalance; and utilization means coupled to said secondary winding.

11. The inverter according to claim 10 wherein said current sensing means comprises a differential current transductor.

* * * * *